(12) United States Patent
Urban

(10) Patent No.: US 10,663,145 B2
(45) Date of Patent: May 26, 2020

(54) COLORED SILICONE GELS FOR TINTING LANDSCAPE LIGHTING

(71) Applicant: Gary M. Urban, Muskego, WI (US)

(72) Inventor: Gary M. Urban, Muskego, WI (US)

(73) Assignee: Gary M. Urban, Muskego, WI (US)

(*) Notice: Subject to any disclaimer, the term of this patent is extended or adjusted under 35 U.S.C. 154(b) by 0 days.

(21) Appl. No.: 16/376,350

(22) Filed: Apr. 5, 2019

(65) Prior Publication Data

US 2019/0323684 A1 Oct. 24, 2019

Related U.S. Application Data

(60) Provisional application No. 62/659,503, filed on Apr. 18, 2018.

(51) Int. Cl.

| | | |
|---|---|---|
| *F21V 9/08* | (2018.01) |
| *F21S 8/08* | (2006.01) |
| *C08J 3/21* | (2006.01) |
| *C08K 5/00* | (2006.01) |
| *B29C 39/00* | (2006.01) |
| *B29K 105/00* | (2006.01) |
| *B29C 33/58* | (2006.01) |
| *B29C 35/02* | (2006.01) |
| *B29K 283/00* | (2006.01) |
| *F21W 131/10* | (2006.01) |

(52) U.S. Cl.
CPC ............ *F21V 9/08* (2013.01); *B29C 39/003* (2013.01); *C08J 3/21* (2013.01); *C08K 5/0041* (2013.01); *F21S 8/083* (2013.01); *B29C 33/58* (2013.01); *B29C 35/02* (2013.01); *B29K 2105/0032* (2013.01); *B29K 2105/0061* (2013.01); *B29K 2283/005* (2013.01); *C08J 2319/00* (2013.01); *F21W 2131/10* (2013.01)

(58) Field of Classification Search
CPC ....... F21V 9/08; F21S 8/083; F21W 2131/10; B29K 2283/005; B29K 2105/0061
See application file for complete search history.

(56) References Cited

U.S. PATENT DOCUMENTS

| 5,143,443 A | * 9/1992 | Madsen | ................... F21V 3/04 313/635 |
|---|---|---|---|
| 5,221,140 A | 6/1993 | Oshino | |

(Continued)

FOREIGN PATENT DOCUMENTS

| CN | 203299484 | * 11/2013 | ............... F21V 9/08 |
|---|---|---|---|
| WO | 2017/106197 A1 | 6/2017 | |

OTHER PUBLICATIONS

International Search Report and Written Opinion for Application No. PCT/US2019/026035 dated Jul. 4, 2019 (8 pages).

(Continued)

*Primary Examiner* — Donald L Raleigh
(74) *Attorney, Agent, or Firm* — Michael Best & Friedrich LLP

(57) ABSTRACT

A lighting assembly includes a lighting fixture. The lighting fixture comprises a housing defining a cavity having an open end and a light source positioned within the cavity of the housing and configured to emit a light from the housing. The lighting assembly further includes a self-adhering, pigmented gel configured to modify the hue of the light from the light source.

20 Claims, 3 Drawing Sheets

(56) References Cited

U.S. PATENT DOCUMENTS

2008/0142829 A1    6/2008  Negley
2017/0167701 A1*  6/2017  Erdener .................. F21V 31/03

OTHER PUBLICATIONS

TopBulb, "SORRA SNAP System—MR16, PAR20—Color Filter, 1/2 CTO, 3000K to 2400K," <https://www.topbulb.com/soraa-ac-cc-0002-00-s1> web page accessed Mar. 22, 2018.

Amazon, "GE Lighting PAR38 LED 7-watt (45-watt Replacement), 550 Lumen PAR38 Light Bulb, Multi-Color Lenses, Medium Base, Daylight, 1 Pack," <https://www.amazon.com/GE-Lighting-Replacement-550-Lumen-Multi-Color/dp/B06ZXTF7LV> web page accessed Mar. 22, 2018.

Bing Image Search, "Colored Filter for Bug Lights" <https://www.bing.com/images/search?view=detailV2&id=BC5F83AB74EBF9306700D988F76FF5BF98ED880A&thid=OIP.mqAsfvXyfh6A5LA3qkJo7gHaHa&exph=800&expw=800&q=colored+filter+for+bug+lights&selectedindex=169&ajaxhist=0&vt=0&eim=1,6> web page accessed Mar. 22, 2018.

* cited by examiner

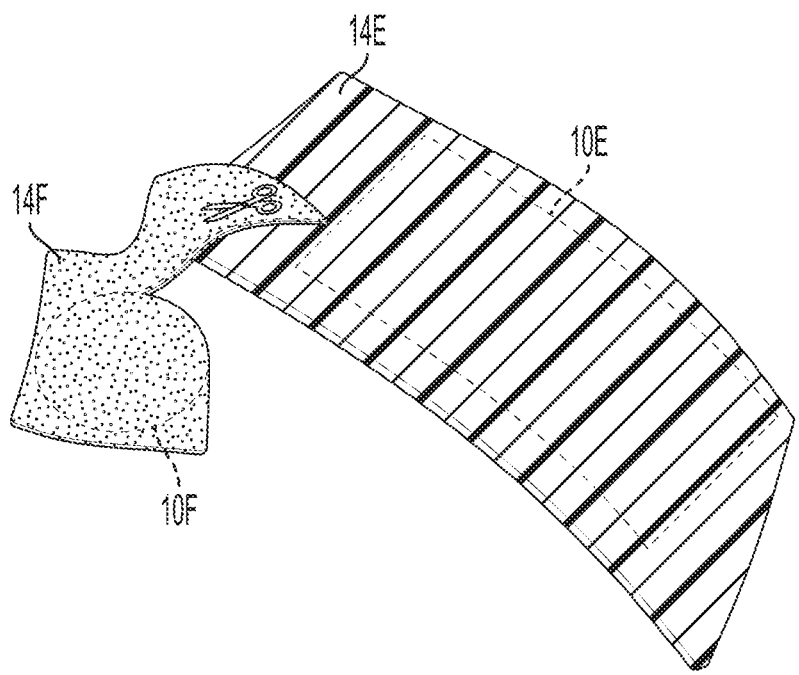
FIG. 4
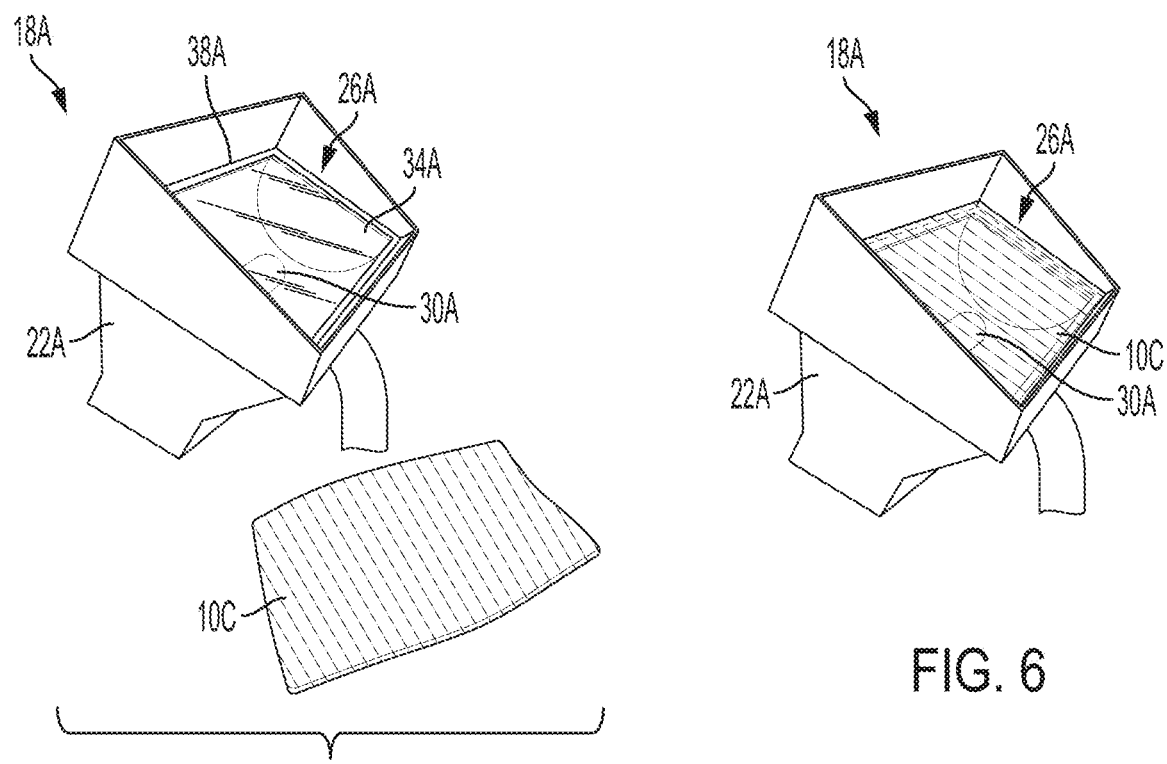
FIG. 5
FIG. 6

COLORED SILICONE GELS FOR TINTING LANDSCAPE LIGHTING

BACKGROUND

The present invention relates to landscape lighting and filters for coloring the light output of landscape lighting fixtures.

Landscape lighting is used to illuminate the exterior of a home or business or to illuminate trees or landscape features of a property. Landscape lighting is accomplished by strategically placing landscape lighting fixtures across a property. These lighting fixtures may include a cylindrical or rectangular housing forming an open-ended cavity, a light bulb positioned within the cavity, and a lens spaced from the light bulb and coupled to the open end of the housing to allow for the passage of light as directed by the housing. The housing and the lens provide the bulb and associated electric connections protection from outdoor weather conditions.

Various ways have been used to vary the color of the light emitted from landscape lighting fixtures. Some light fixtures are specially formed to receive a colored, hard plastic disc that is held in place by the interference fit between the outside diameter of the hard plastic disc and the inner diameter of a recess in the fixture. Other products used to color landscape light output use a mechanical connection (such as clips) to hold hard plastic covers onto the fixture. These hard plastic discs and covers are fixture specific and cannot be used universally on other lighting fixtures.

SUMMARY

The present invention is a versatile and universal filter usable with landscape lighting fixtures. In one embodiment, the filter is a flexible, pigmented silicone gel and can be adhered to a landscape lighting fixture using the tacky properties of the silicone gel. In other embodiments, the gel can be formed into sheets and then cut to size by the end user to fit any brand, size or style of lighting fixture (such as an up-light or accent light fixture). In yet other embodiments, the gel can self-adhere to the exterior lens of a landscape lighting fixture allowing it to be simply installed within seconds, with no need to disassemble the fixture.

In another embodiment, a lighting assembly comprises a lighting fixture. The lighting fixture comprises a housing defining a cavity having an open end and a light source positioned within the cavity of the housing and configured to emit a light from the housing. The lighting assembly further comprises a self-adhering, pigmented gel configured to modify the hue of the light from the light source.

In yet another embodiment, a method of generating a colored light with a lighting fixture includes applying a self-adhering, pigmented gel onto a lens or a bulb of the lighting fixture such that the self-adhering, pigmented gel is in direct contact with the lens or the bulb, and emitting light from a light source, through the lens or the bulb, and through the self-adhering, pigmented gel.

Other aspects of the invention will become apparent by consideration of the detailed description and accompanying drawings.

BRIEF DESCRIPTION OF THE DRAWINGS

FIG. 4 illustrates a process of resizing a colored gel.

FIG. 5 illustrates a lighting fixture and a colored gel separate from one another.

FIG. 6 illustrates the colored gel and the lighting fixture of FIG. 5 attached together.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 8:
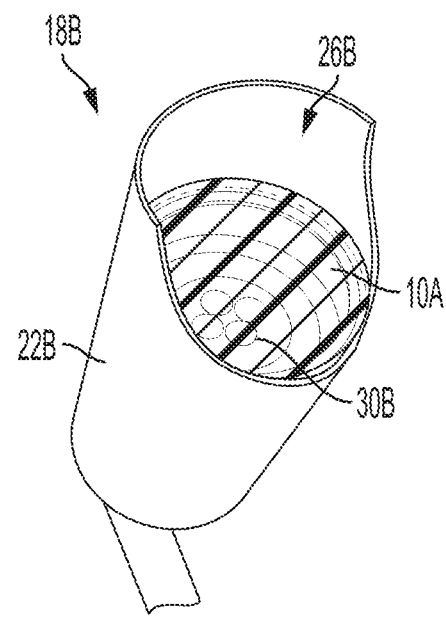
FIG. 8 illustrates a colored gel and the lighting fixture of FIG. 7 attached together.
Figure 9:
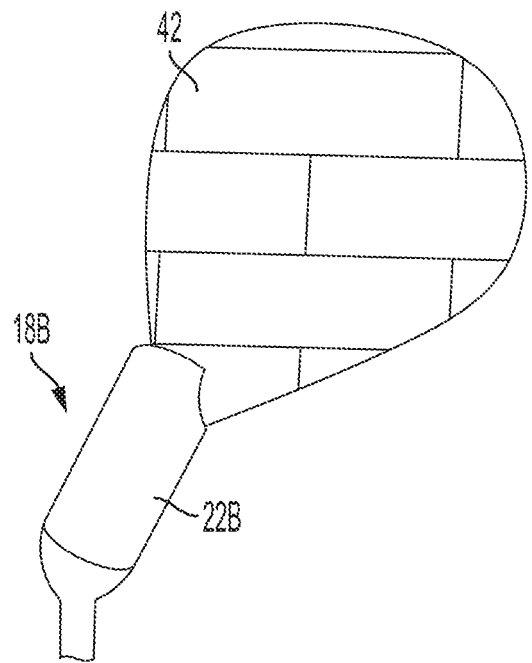
FIG. 9 illustrates the lighting fixture of FIG. 7 illuminated without the colored gel.
Figure 10:
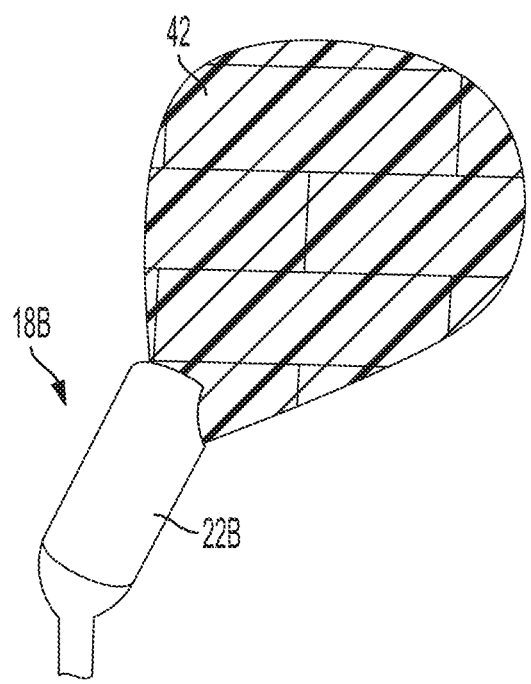
FIG. 10 illustrates the lighting fixture of FIG. 8 illuminated with the colored gel installed.

Various landscape lighting fixtures 18A, 18B are illustrated in FIGS. 5-10. These lighting fixtures include a cylindrical or rectangular housing 22A, 22B forming an open-ended cavity 26A, 26B, a light source (such as a light bulb) 30A, 30B positioned within the cavity, and a lens 34A, 34B spaced from the light bulb 30A, 30B and coupled to the open end of the housing 22A, 22B to allow for the passage of light from the light source 30A, 30B to the surroundings of the lighting fixture 10A, 10B as directed by the housing 22A, 22B. In some embodiments, the lens 34A, 34B is held to the housing 22A, 22B via a frame 38A, 38B. The housing 22A, 22B and the lens 34A, 34B provide the bulb 30A, 30B and the associated electric connections (not shown) protection from outdoor weather conditions. As shown in FIG. 9, when illuminated, the bulb will radiate light of a single color (typically natural light or "white" light) through the lens to accent landscape features 42 of a building, such as a home or office. As shown, the landscape feature 42 is a brick facade on an exterior of a building. The lighting fixture may otherwise light other outdoor features such as vegetation, landmarks, or decorations. In some embodiments, the lighting fixture may be located indoors.

Figure 1:
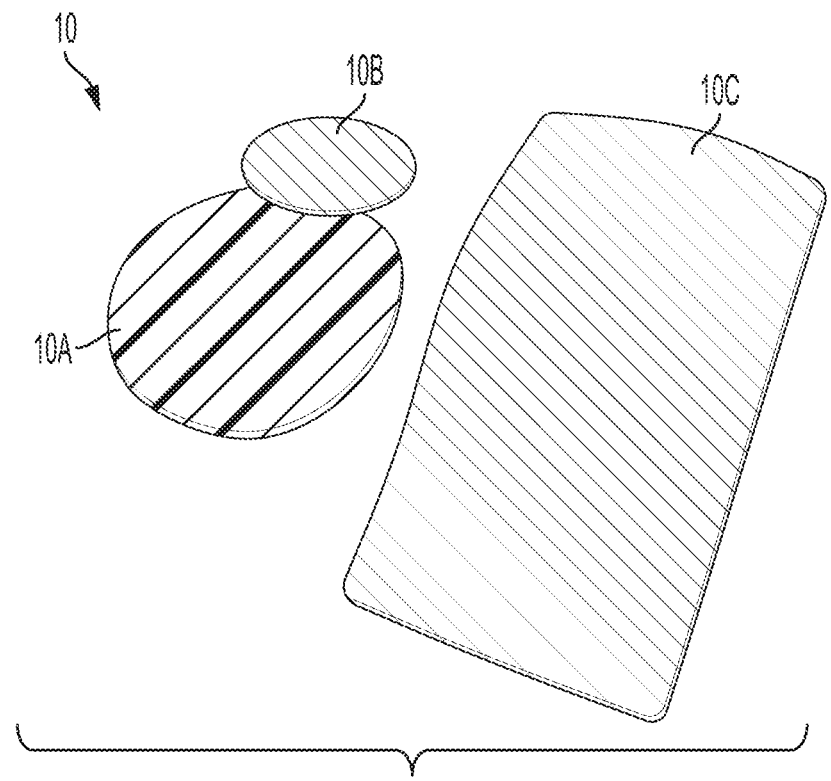
FIG. 1 illustrates a plurality of colored gels in various sizes and shapes.
Figure 2:
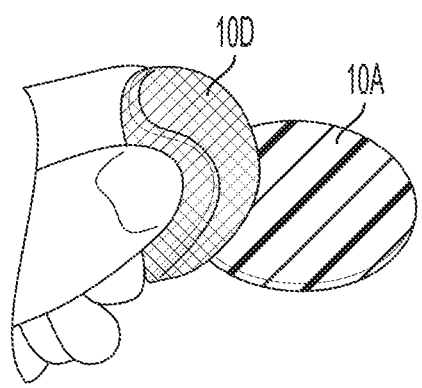
FIG. 2 illustrates the flexibility of one of the colored gels.

As shown in FIGS. 5-10, a colored filter is attachable to the lighting fixture to vary the color projected from the fixture according to the color of the colored filter. The colored filter 10 is referred to herein as a gel 10. Reference numeral 10 is used to generically refer to the gels shown in the figures and described herein, though individual iterations of the gel 10 are referenced by 10A (FIGS. 1, 2, and 8), 10B (FIG. 1), 10C (FIGS. 1, 5, and 6), 10D (FIGS. 2-3), 10E (FIGS. 4), and 10F (FIG. 4).

The gels 10 are made from a pigmented silicone that when applied to the exterior lens 34A, 34B of a lighting fixture 18A, 18B (such as an outdoor up or accent landscape light), will change the color of the light that is emitted from the light source 30A, 30B to the color of the pigmented silicone. The gel 10 can be applied to or removed from the lighting fixture 18A, 18B any time a user wishes to change the color of their landscape lights. For example, the gels 10 can be applied in both residential and commercial applications and changed for festive holiday lighting (e.g., Christmas, New Year's, Valentine's Day, Independence Day, Halloween, etc.). Further, the gels 10 can be used commercially to change the exterior lights of a business to the businesses company colors. The gels 10 can be made in standard colors or custom mixed colors as desired. The gels 10 are washable by water and re-usable again and again. The gels 10 self-adhere to the exterior lens 34A, 34B of the landscape lighting fixture 18A, 18B allowing them to be installed within seconds, with no need to disassemble the fixture 18A, 18B or modify the fixture 18A, 18B to include additional attachment points. The gels 10 are self-adhering gels, such that they have the tackiness, stickiness, or glueyness to adhere to a surface without an added adhesive or fastener.

As shown in FIGS. 6 and 8, the gels 10 adhere to the lens 18A, 18B and are adhered in a temporary manner using the tackiness of the silicone gel, without any additional adhesive and without any mechanical connection. When removed, the gels 10 do not leave any residue on the lens 34A, 34B of the fixture 18A, 18B. The gels 10 adhere to the lens 34A, 34B regardless of the lens angle relative to vertical. Therefore, the gel filter 10 can be applied to lighting fixtures 18A, 18B that are mounted to a ground surface, a vertical or wall surface, and a ceiling-like surface such as the underside of an eave or soffit.

Figure 3:
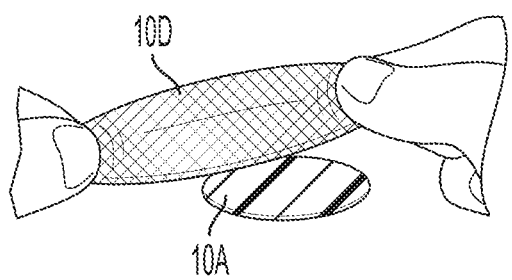
FIG. 3 illustrates the elasticity of one of the colored gels.
Figure 7:
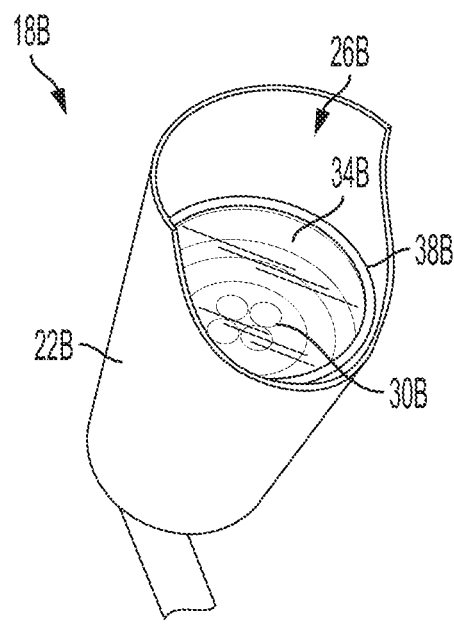
FIG. 7 illustrates another lighting fixture without a colored gel.

The gel 10 is composed of a silicone rubber and, in one embodiment, is formed from a two part silicone mixture such as Smooth-On Ecoflex™ 00-10, available from Smooth-On, Inc, located in Macungie, Pa. The gels 10 are flexible and resilient, as shown in FIGS. 3 and 4, and can be stretched and bent (e.g., for bending along a non-planar lens) without ripping, tearing, or plastically deforming. Tinting or coloring of the gels 10 is accomplished using a liquid silicone pigment such as Silc-Pig™, available from Smooth-On, Inc., or Silicone Pigment, available from Douglas and Sturgess located in Richmond, Calif. The amount of liquid silicone pigment is varied depending on the color and opacity a user is looking to achieve.

When manufacturing the gels 10, the liquid silicone rubber (e.g., two-part liquid silicone rubber) is first tinted (in its liquid state, for example, in either the A or B portion before combining), then the mixture is poured into the desired mold/shape. The depth of the mold is of the desired thickness for the liquid gel or otherwise the liquid gel is poured to the desired thickness within a mold having a greater depth. A release agent (e.g., commercial plastic release agent, petroleum jelly, Vaseline) is applied to the forms before pouring to allow for easy extraction from the mold once the silicone has cured.

In some embodiments, the thickness of the gels 10 is $\frac{1}{16}$ inch. In other embodiments, the thickness of the gels 10 is between $\frac{1}{32}^{nd}$ of an inch and $\frac{5}{32}^{nd}$ of an inch. In yet other embodiments, the thickness 10 of the gels is between $\frac{1}{32}^{nd}$ of an inch and $\frac{3}{32}^{nd}$ of an inch. The thickness of the gels 10, along with the amount of pigment used affects the color and brightness of the light output.

The gels 10 are adaptable to work on all types of lighting fixtures. The gels 10 can be applied to flat, concave or convex exterior light lenses 34A, 34B. The gels 10 can be applied to fixtures with all types of bulbs 30A, 30B such as LED, incandescent, compact florescent, or halogen bulbs. The gels 10 can be placed on the exterior lens 34A, 34B of the fixture 18A, 18B rather than the bulb 30A, 30B itself. Therefore there is no need to open the fixture 18A, 18B to gain access to the bulb 30A, 30B to insert the gel 10. The gels 10 can be applied to any brand of light fixture 18A, 18B to convert the light fixture 18A, 18B to a colored light fixture and can be applied to nearly any style of up/accent light fixture 18A, 18B. The gels 10 can be applied to fixtures 18A, 18B that use low voltage (12 volt) lights or line voltage (120 volt). The gels 10 further work on surfaces with temperatures at the point of contact (with the gel 10) of up to 400 degrees Fahrenheit (200 degrees Celsius).

In some embodiments, the gels 10 can adhere directly to the exterior glass of the bulb 30A, 30B itself, such as when the bulb 30A, 30B has a relatively cool operating temperature, (e.g., below 400 degrees Fahrenheit), such as an LED bulb.

The gels 10 can be formed to fit any light size such as: (i) MR16: 16 eighths of an inch or 2 inches/5 centimeters in diameter; (ii) MR8: 1 inch or 2.5 centimeters in diameter; and (iii) MR11: 1⅜ inch or 3.5 centimeters in diameter. The gels 10 can be sheet formed to any size to allow for larger (e.g., rectangular, circular) light lenses. The gel shapes can be die-cut from the gel sheets 14E, 14F to fit specific light sizes. The gel 10 can be cut from the sheet (or pre-cut) to fit (e.g., cover) the lens 34A, 34B or to fit (e.g., cover) the lens 34A, 34B and the surrounding lens frame 38A, 38B. In addition, when formed to a large sheet 14E, 14F, the gels 10 can easily be custom cut, e.g., by a consumer/end user, to fit any light shape by using a household scissors or razor blade.

The gels 10 are weather proof (water proof/rain and snow proof). The gels 10 remain adhered to light lenses 34A, 34B in all weather conditions including driving rain. The gels 10 remain flexible down to −50 degrees Fahrenheit (−46 degrees Celsius). The gels 10 are heat resistant (up to 400 degrees F.) and are not damaged from exposure to the sun.

The invention provides, among other things, a versatile and universal filter usable with landscape lighting fixtures 18A, 18B. In one embodiment, the filter is a flexible, pigmented silicone gel 10 and can be adhered to a landscape lighting fixture 18A, 18B using the tacky properties of the silicone gel 10. In other embodiments, the gel 10 can be formed into sheets 14E, 14F and then cut to size by the end user to fit any brand, size or style of lighting fixture 18A, 18B (such as an up-light or accent light fixture). In yet other embodiments, the gel 10 can self-adhere to the exterior lens 34A, 34B of a landscape lighting fixture 18A, 18B allowing it to be simply installed within seconds, with no need to disassemble the fixture 18A, 18B.

What is claimed is:
1. A lighting assembly comprising:
   a lighting fixture comprising:
      a housing defining a cavity having an open end, and
      a light source positioned within the cavity of the housing and configured to emit a light from the housing; and
   a self-adhering, pigmented gel configured to modify the hue of the light from the light source.
2. The lighting assembly of claim 1, wherein the self-adhering, pigmented gel is a silicone gel.
3. The lighting assembly of claim 1, wherein the lighting fixture further comprises a lens positioned at the open end of the housing, wherein the light source is configured to emit a light through the lens, and wherein the self-adhering pigmented gel is positioned on the lens to modify the hue of the light from the light source.
4. The lighting assembly of claim 3, wherein the self-adhering, pigmented gel includes an interior surface in contact with the lens, wherein the interior surface is a silicone surface.
5. The lighting assembly of claim 3, wherein the self-adhering, pigmented gel is configured to adhere to the lens without a separate adhesive or fastener.
6. The lighting assembly of claim 3, wherein the lens of the lighting fixture is oriented at an angle relative to a vertical direction, and wherein the self-adhering, pigmented gel is configured to adhere to the lens regardless of the angle of the lens relative to the vertical direction.

7. The lighting assembly of claim 3, wherein the lens includes an interior surface adjacent the light source and an exterior surface opposite the interior surface, wherein the self-adhering, pigmented gel is positioned on the exterior surface of the lens.

8. The lighting assembly of claim 7, wherein the exterior surface of the lens is covered by the self-adhering, pigmented gel.

9. The lighting assembly of claim 1, wherein the self-adhering, pigmented gel is configured to temporarily adhere to the lighting fixture such that the self-adhering, pigmented gel is removable from the lighting fixture.

10. The lighting assembly of claim 1, wherein the self-adhering, pigmented gel is a flat sheet applied to the light fixture.

11. The lighting assembly of claim 1, wherein the lighting fixture further comprises a bulb at least partially surrounding the light source, wherein the light source is configured to emit a light through the bulb, and wherein the self-adhering, pigmented gel is positioned on the bulb of the light source.

12. A method of generating a colored light with a lighting fixture, the method comprising:
   applying a self-adhering, pigmented gel onto a lens or a bulb of a light source of the lighting fixture such that the self-adhering, pigmented gel is in direct contact with the lens or the bulb; and
   emitting light from a light source, through the lens or the bulb, and through the self-adhering, pigmented gel.

13. The method of claim 12, further comprising:
   combining a liquid silicone rubber with a silicone dye to create a silicone mixture; and
   solidifying the silicone mixture in a mold to produce the self-adhering, pigmented gel.

14. The method of claim 13, further comprising pouring the silicone mixture into the mold into the mold to a thickness of between $1/32$ inch and $5/32$ inch.

15. The method of claim 13, further comprising cutting the self-adhering, pigmented gel to match the size and shape of the lens or the bulb prior to applying the self-adhering, pigmented gel onto the lens or the bulb, respectively.

16. The method of claim 12, wherein applying the self-adhering, pigmented gel onto the lens or the bulb includes contacting a silicone surface of the self-adhering, pigmented gel with the lens or the bulb, respectively.

17. The method of claim 12, wherein the self-adhering, pigmented gel is applied to the lens of the lighting fixture, wherein the lens includes an interior surface adjacent the light source and an exterior surface opposite the interior surface, wherein applying the self-adhering, pigmented gel onto the lens includes applying the self-adhering, pigmented gel onto the exterior surface of the lens.

18. The method of claim 12, wherein applying the self-adhering, pigmented gel onto the lens or the bulb adheres the self-adhering, pigmented gel to the lens or the bulb, respectively, without additional adhesives or fasteners.

19. The method of claim 12, further comprising orienting the lighting fixture at an angle relative to a vertical direction, wherein the self-adhering, pigmented gel adheres to the lighting fixture regardless of the angle of the lens or the bulb relative to the vertical direction.

20. The method of claim 12, wherein the self-adhering, pigmented gel is a flat sheet, and wherein applying the self-adhering, pigmented gel onto the lens or the bulb includes placing the flat sheet onto the lens or the bulb.

* * * * *